Patented Sept. 13, 1949

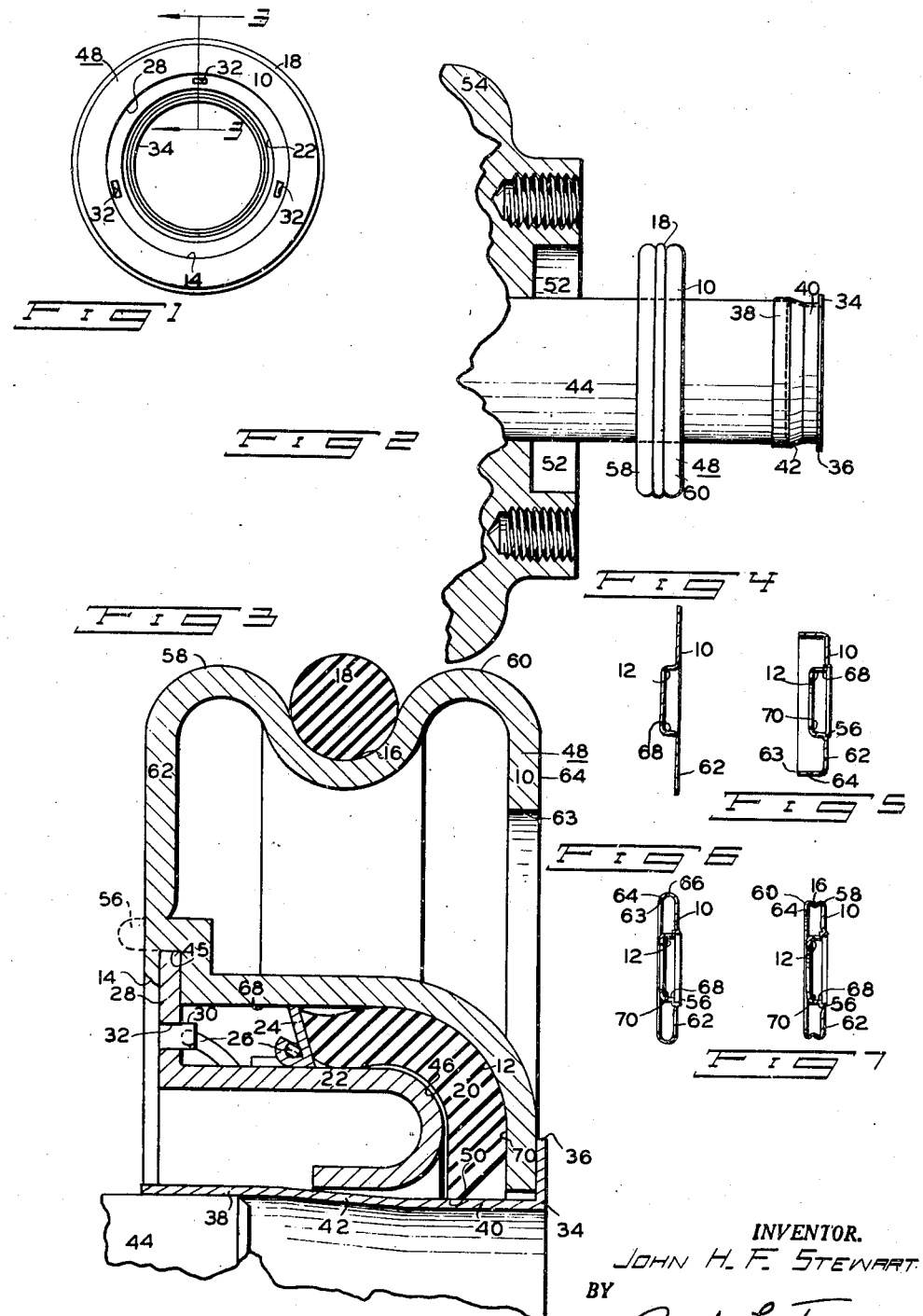

2,481,793

UNITED STATES PATENT OFFICE 2,481,793

FLUID SEALING DEVICE

John H. F. Stewart, Mount Clemens, Mich.

Application May 11, 1946, Serial No. 669,032

5 Claims. (Cl. 288—3)

This invention relates to sealing devices such as are used to form a fluid type seal with a cylindrical surface commonly known as oil seals and used, for example, on sliding piston rods, rotating shafts, and the like. In the patent to Stewart (No. 2,332,763), there is disclosed a fluid sealing device in which a tubular sealing sleeve of flexible material is confined between two guide surfaces extending axially and then radially into engagement with the cylindrical surface to be sealed.

It is an object of the present invention to improve the construction of the seal disclosed in the Stewart patent and provide a seal having greater efficiency, longer life and lower cost.

In the seal illustrated in the Stewart patent, the elements are machined from solid metal blanks and are individually assembled during installation. It was impractical in practicing that invention to furnish the complete seal ready for installation as a finished packaged article. The cost of machining as well as the loss of materials due to machining was considerable. The time of manufacturing a formed article by removing stock during a machining operation was excessive as compared with stamping and spinning the same article from sheet stock.

The method of assembling the pieces machined from solid metal stock is usually by screw threads, an expensive means of producing a packaged article. By employing formed sheet metal, a packaged article can usually be assembled by merely spinning the bead formed on either part over its mating part.

An object of this invention is to provide a fluid seal for cylindrical surfaces incorporating improvements in design wherein the entire body may be constructed of sheet metal by stamping and spinning methods.

A further object is to provide an article of manufacture including a seal protector as a detachable part thereof, and constructed in a manner to prevent its accidental ejectment before assembly on the cylindrical piece to be sealed.

Still another object is to provide a seal capable of being assembled into a packed unit and maintained as such by spinning the various elements into a permanent structure incapable of being tampered with or thrown out of adjustment.

Further objects and advantages of the present invention will be apparent from the following description, reference being had to accompanying drawig wherein a preferred form of the present invention is clearly shown.

In the drawing:

Figure 1 is an end elevation of the seal employed for sealing a shaft.

Figure 2 is a side elevation of the seal in the process of being mounted on the shaft.

Figure 3 is an enlarged sectional view on line 3—3 of Figure 1 showing the details of the sheet metal structure.

Figures 4 to 7 show progressively various stages in the manufacture of the sheet metal body element, in cross-sectional views on the center line.

The enlarged sectional view of the seal shown in Figure 3 includes the body 10 incorporating a seal guide surface 12, an assembly lip 14, and an annular groove 16 for holding the torus peripheral seal 18 between the annular ridges of semi-circular cross-section. The sealing element 20 is positioned between the guide surface 12 and the insert or retainer 22. A resilient element 24 is located between the guide surface 12 and retainer 22 and adapted to bear against the inner end of the sealing element 20. Springs 26, fastened to the element 24, rest against the retainer flange 28 and are adapted to contact the lips 30. The lips 30 are formed on the inside of the retainer flange 28 when the fluid pressure ports 32 are stamped into the retainer 22 during manufacturing.

A seal protector 34 is provided with a flanged end 36 and a sleeve portion including a large diameter section 38, a small diameter section 40 adjacent to flange 36, and a conical section 42 positioned between the large and small diameter sections. The protector diameters are sized to admit the shaft 44 into the larger section, but prevent it passing through the smaller section.

One of the novel features of the proposed seal is the housing design which comprises two main elements. One of the elements is designated as the body 10 and the other element, the retainer or cap 22. Both the body and the retainer are formed from sheet metal stock. Their cross-sections present difficult manufacturing problems in the field of forming and spinning. The important steps in the manufacture of the body element 10 are illustrated in Figures 4 to 7 inclusive.

Figure 4 illustrates the cross-section of the circular body element blank after the first drawing operation. In Figure 5 the assembly bead 56 has been formed, the internal bore pierced, and the external bore or periphery of the body developed. In Figure 6, the peripheral surface has been curled and is shown ready for the spinning operation. In producing the annular groove 16 for the torus seal 18, a forming tool is forced into the curled surface 66 to produce the new peripheral surface shown in Figure 7.

The internal bore of the body element 10 comprises an axial portion 68 and an inwardly curved radial flange 70. In combination they provide the sealing element guide surface 12. At the axial end of the internal bore of the body 10, a counterbore 45 is provided. The flange 28 of retainer 22 is adapted to fit the counterbore 45. During the assembly of the housing the lip 56 is spun or beaded over the flange 28 as shown at 14 to form a permanent packaged seal.

A cross-section of the external bore or periphery of the body 10 will disclose that it has the general shape or form of a double S curve. In other words, an annular groove 16 is centrally located and two approximately semi-circular ridges 58 and 60 on either side of the groove 16 for the said double S curve. The ridge 58 connects tangentially to the web 62 while the ridge 60 extends to the outer flange portion 64 of the body element 10.

The manufacturing processes for forming the annular groove 16 require first that the periphery be curled as shown in Figure 6. The next step requires the forming tool to be forced into the curled portion 66. By studying Figures 6 and 7, it will be apparent that little room is available for locating a female forming die behind the curled portion 66. Therefore, since it was impractical to use a female die, a novel method of clamping and supporting the stock was devised. The novel device includes a rigid support for the web 62 and an end support for the tip 63 at the flange 64. Therefore, by properly contouring the curled surface 66 and supporting the tips thereof, the groove 16 could be produced with extremely accurate dimensions.

The packaged seal is manufactured by forming the body blanks on a stamping machine after which they are spun into dimensional shape for assembly. The protector 34 is first located in body 10 and then the sealing element 20 is installed. The spring or resilient element 24 is assembled on the retainer 22 and positioned as shown in Figure 3 adjacent the inner surface 46 of the sealing element. The lip 14 of body 10 is then spun over the flange 28 of the retainer 22 to form a packaged non-adjustable seal. The resilient torus seal 18 may be placed in position at any time and has no direct functional effect on the subject of this invention.

In operation, the seal 48 may be assembled on the shaft 44 by merely guiding the shaft 44 into the larger bore 38 of the protector sleeve. The outside diameter of the shaft 44 will approximately equal the inside larger diameter of the sleeve of the protector 36. When the shaft 44 reaches some point on the internal bore of the conical section 42, the shaft 44 will force the protector 36 out of the seal 48. During this step in the assembly, the sealing element 20 will be expanded over the conical section 42 and slide along the larger diameter 38 until the protector 34 is removed from the seal 48, and the sealing element 20 will again contract to its normal position on the shaft 44. The outer diameter of the sleeve section 40 is preferably equal to the outside diameter of the shaft 44 whereby the sealing element 20 during storage will occupy its normal position during use.

Other features of the protector 34 are its length, and the flange 36. By keeping the protector 34 the same length as the total width of the seal 48, no protruding portions exist which might allow accidental removal of the protector 34. Further, the flange 36 absolutely prevents ejecting the protector from the right side toward the left as shown in Figure 3. Therefore, the seal must be assembled on the shaft in one direction only. Another steadying feature of the protector is the fact that the sealing element 20 is in frictional contact with the lowest point of the periphery and the protector 34, and therefore, additional force is required to expand the element 20 over the conical section in order to remove the protector.

After the protector 34 has been removed, the tip 50 of the sealing element 20 will bear against the shaft 44. Its bearing pressure against the shaft depends upon the force of the resilient element 24 actuated by springs 26, in combination with fluid pressure admitted from the pressure side of the seal 48 to the ports 32. Either the resilient element 24 or the fluid pressure may actuate the seal element 20, but the combination improves the operation in many cases since the fluid pressure against the element 20 varies with the force required to assure proper sealing. As the tip 50 of the sealing element 20 wears, the element 20 is extruded through the passage formed between the guide surface 12 and the body 10 and the retainer 22. Thus, the sealing surface or tip 50 is constantly being replaced and will extend the life of the seal 48 far beyond one of standard design.

In Figure 2, the seal 48 is shown being assembled on the shaft 44. The seal 48 will be moved along the shaft 44 to the left in Figure 2 until it occupies the recess 52 of the machine 54. It will be noted in the view that the protector 34 remains on the end of the shaft 44 from which it will be taken and discarded.

It will thus be seen that the present invention has provided an improved seal structure for cylindrical surfaces whereby tampering with the elements is prevented and a light weight, long life economically manufactured packaged article results. This is accomplished by novel design and assembly methods for producing the seal of formed sheet metal.

While the form of embodiment of the invention as herein disclosed constitutes a preferred form, it is to be understood that other forms might be adopted, all coming within the scope of the claims which follow.

What is claimed is as follows:

1. In a device for forming a seal for cylindrical surfaces comprising a formed sheet metal housing provided with an internal guide surface, a closure cap provided with an external guide surface, means for assembling the body and cap to form an extruding chamber between the adjacent guide surfaces, said chamber terminating at a point where the cylindrical surface is to be sealed, a sealing element concentric with the surface to be sealed and adapted to fill at least that portion of the extruding chamber adjacent the cylindrical surface, resilient means located in the chamber for extruding the sealing element to maintain a continuous sealing contact between the element and cylindrical surface, and lips on the inner surface of the cap adapted to engage with the resilient means and prevent rotation thereof relative to the cap.

2. A cartridge-type shaft seal comprising a sheet metal housing of generally annular shape and having an outer wall shaped to telescope into a receiving bore in a machine part, an annular web extending radially inward from the outer wall, and re-entrant guide portion substantially coextensive axially with the outer wall and formed with a quarter toroidal female guide surface; a closure cap having a parallel guide portion formed with a quarter-toroidal male guide surface and a supporting portion engaging the housing member; deformable means securing the cap to the housing and a resilient sealing element positioned between the guide surfaces having a sealing lip extending into sealing engagement with a shaft surface.

3. A cartridge-type shaft seal comprising a sheet metal housing of generally annular shape and having an outer wall shaped to telescope into a receiving bore in a machine part, an annular web extending radially inward from the outer wall, and a re-entrant guide portion substantially coextensive axially with the outer wall and formed with a quarter-toroidal female guide surface; a closure cap having a parallel guide portion formed with a quarter-toroidal male guide surface and supporting portion engaging the housing member; said housing having a shoulder formed at the junction of the web with the re-entrant guide portion and said cap supporting portion being positioned on said shoulder; deformable means securing the cap to the housing and a resilient sealing element positioned between the guide surfaces having a sealing lip extending into sealing engagement with a shaft surface.

4. A cartridge-type shaft seal comprising a sheet metal housing of generally annular shape and having an outer wall shaped to telescope into a receiving bore in a machine part, an annular web extending radially inward from the outer wall, and a re-entrant guide portion substantially coextensive axially with the outer wall and formed with a quarter-toroidal female guide surface; a closure cap having a parallel guide portion formed with a quarter-toroidal male guide surface and a supporting portion engaging the housing member; said housing having a shoulder formed at the junction of the web with the re-entrant guide portion and said cap supporting portion being positioned on said shoulder; deformable means comprising a spun-over bead adjacent the shoulder and overlying the cap supporting portion securing the cap to the housing and a resilient sealing element positioned between the guide surfaces having a sealing lip extending into sealing engagement with a shaft surface.

5. A cartridge-type shaft seal comprising a sheet metal housing of generally annular shape and having an outer wall shaped to telescope into a receiving bore in a machine part, means forming a groove in said outer wall, an O-ring seal mounted in the groove, an annular web extending radially inward from the outer wall, and a re-entrant guide portion substantially coextensive axially with the outer wall and formed with a quarter-toroidal female guide surface; a closure cap having a parallel guide portion formed with a quarter-toroidal male guide surface and a supporting portion engaging the housing member; deformable means securing the cap to the housing and a resilient sealing element positioned between the guide surfaces having a sealing lip extending into sealing engagement with a shaft surface.

JOHN H. F. STEWART.

REFERENCES CITED

The following references are of record in the file of this patent:

UNITED STATES PATENTS

| Number | Name | Date |
| --- | --- | --- |
| 1,992,790 | Victor et al. | Feb. 26, 1935 |
| 2,037,046 | Robertson | Apr. 14, 1936 |
| 2,092,237 | Antonelli et al. | Sept. 7, 1937 |
| 2,100,113 | Travis | Nov. 23, 1937 |
| 2,332,763 | Stewart | Oct. 26, 1943 |
| 2,405,120 | Evans | Aug. 6, 1946 |